March 25, 1952  D. H. CASTLE  2,590,230
CATHODE-RAY TUBE AMPLITUDE INDICATING APPARATUS
Filed Dec. 26, 1947
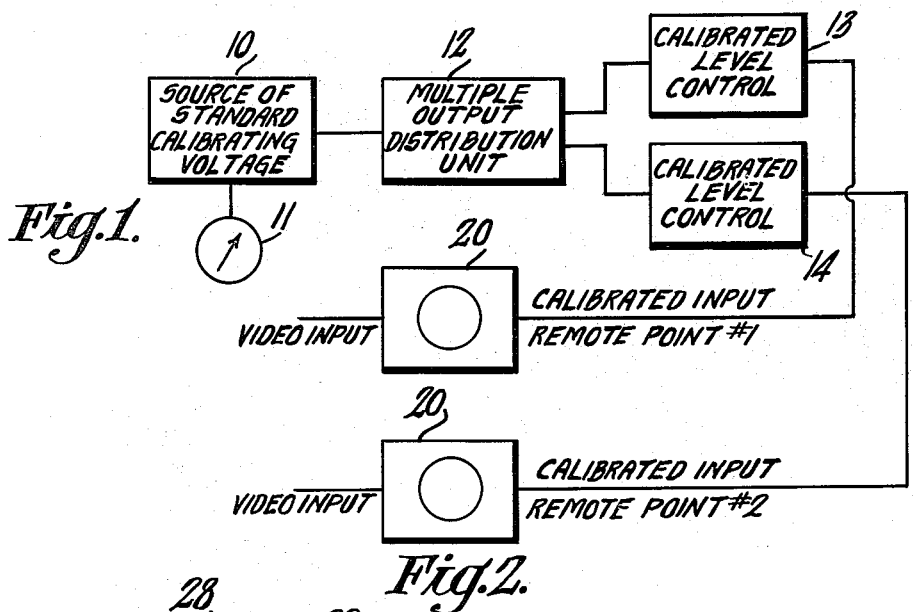
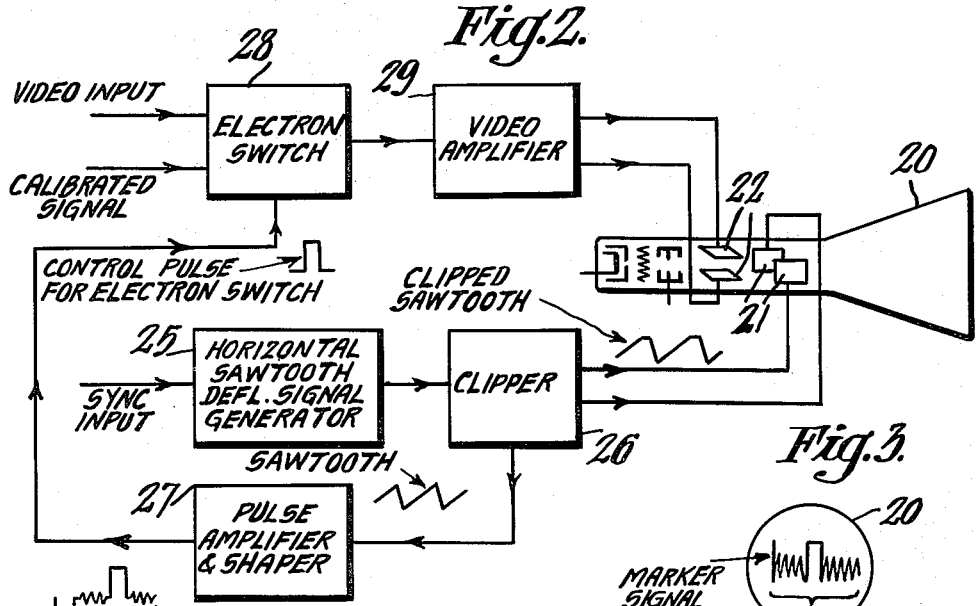
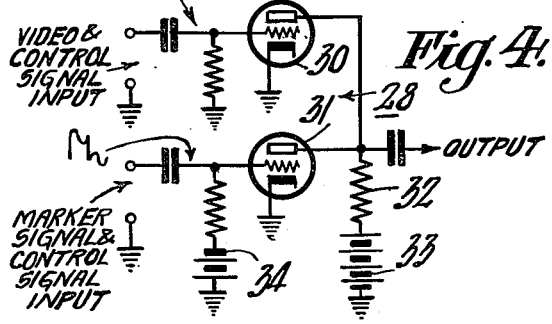
INVENTOR.
Donald H. Castle
BY
ATTORNEY Patented Mar. 25, 1952

2,590,230

UNITED STATES PATENT OFFICE 2,590,230

CATHODE-RAY TUBE AMPLITUDE
INDICATING APPARATUS

Donald H. Castle, New Canaan, Conn., assignor to Radio Corporation of America, a corporation of Delaware Application December 26, 1947, Serial No. 794,030

9 Claims. (Cl. 171—95)

This invention relates, in general, to indicating apparatus and circuit, and more particularly to apparatus and circuits for indicating the level of signals at a particular point in an electrical system such for instance as a television plant.

In television plants just as in broadcast plants, the maintenance of proper signal levels is very important. In sound broadcasting plants the volume indicator provides a very simple means of checking sound levels and it has been standard practice to connect volume indicators to all points where monitoring and level checking are necessary or desirable. In television practice, cathode ray oscilloscopes provide a visual indication for checking video levels. In the practice of the prior art to which this invention belongs, the cathode ray oscilloscope tube usually has had an amplifier driving it and the gain of the amplifier may be varied to suit the desired "picture" size and the signal level. The amplifiers are adjusted by connecting their input to a source of known voltage. The amplifier gain is adjusted to provide the desired size pattern and this is usually to suit guide lines which have been marked on the face of the cathode ray tube. The so adjusted amplifier and cathode ray tube are then used for video signal monitoring without disturbing the amplifier gain control setting.

This method is very cumbersome and forces the operator to retain in his memory a knowledge of the proper signal level at the point he is to monitor. Also, if the monitor is to be used in various connections, it must be re-calibrated every time the signal level is changed. It is one of the objects of my invention therefore, to provide apparatus and circuits for indicating the signal level at a particular point in an electrical system and in which the disadvantages outlined above will be obviated.

It is a further object to produce an apparatus and circuits for virually reproducing in a television plant a continuous visual indication of the amplitude value of a signal of known preselected voltage and which may be visually compared with the reproduction of signals occurring at a selected location in the television plant for the purpose of enabling an operator to adjust the signals to a desired level by comparison with a visual indication with the signal of known voltage.

It is a further object of the invention to provide at various portions of an electrical system selected voltages of known value which are derived from a single calibrated source and which are indicative of the proper signal level which should appear at that location in the electrical system and while this is particularly adaptable for use in television plants, it will be appreciated that its use is not limited thereto.

It is still an additional object of my invention to provide apparatus which will be accurate regardless of such factors as changing characteristics of tubes used in the apparatus which may be caused by aging of the tubes or by changes in the voltages supplied thereto.

Other objects and advantages will be apparent from a reading of the hereinafter appended specification and claims.

My invention in general, contemplates the provision of a calibrated source of standard voltage, and the value of the voltage may be checked and maintained correct by constant checking with voltage indicating devices. In a television plant for instance, the voltage could be the ordinary 60 cycle sine wave produced from a well regulated power source and which could be checked by a good volt meter. This calibrated voltage which, being of sine wave shape, is easily transportable to various points in an electrical system, is then impressed onto a multiple distribution unit, and from the distribution unit there may be derived a number of different output voltages, each of a selected value, and each of which may be conducted to a particular point in the electrical system, which may be for instance a television plant, and will be selected so as to correspond in general, with the proper signal level at that particular point in the system.

Using one point in the system for illustrative purposes, the sine wave calibrated voltage is received at the point for utilization in indicating the proper signal level at that point. There is provided at this point, a normal cathode ray oscilloscope tube which may have either electrostatic deflecting means or electromagnetic deflecting means and which is used for monitoring purposes.

A sawtooth wave generator is provided and may, if desired, be driven by the synchronizing pulses developed by a "sync" generator. These devices are usually present at various parts of a television plant, however, this is not a necessary feature of the invention. The generator would be free running rather than driven by synchronizing pulses. The sawtooth shaped output of the generator is passed through a clipper circuit which limits the amplitude of the wave thus producing a wave having a sawtooth component with a flattened upper section.

The output of the clipper is impressed onto the horizontal deflecting means of the monitor tube with the result that the beam will be deflected horizontally at a linear rate for a portion of its sweep and when the flattened part of the sawtooth wave is impressed onto the deflecting means, the deflection of the beam will be stopped for the interval during which the flattened portion of the wave occurs.

The output of the clipper also is impressed onto a pulse shaper which produces from the distorted sawtooth wave, a wave having a substantially rectangular shape and occurring during the interval when the flattened portion of the distorted sawtooth wave occurs. The rectangular wave is impressed onto an electronic switch which has both the signal whose level is to be indicated and the calibrated voltage of known value impressed onto the input thereof. In actual practice, this in an electronic type of switch.

The signal whose level is to be indicated or set is normally conducted through the switch and passed to an adjustable gain amplifier whose output is connected to the vertical deflecting means of the monitor tube. During the interval when the rectangular pulse from the pulse shaper is impressed onto the electronic switch, and this interval corresponds to the interval during which the flattened portion of the distorted sawtooth wave occurs and hence the horizontal deflection of the beam of the monitor tube is stopped, the calibrated signal of known voltage is passed through the electronic switch and impressed onto the vertical deflecting means of the monitor tube. During this time the signal whose level is to be measured is excluded from the tube by the action of the electronic switch.

There will be produced by the action of the calibrated signal a mark on the face of the tube whose length is indicative of the peak amplitude of the calibrated signal and which has been selected as being indicative of the proper signal level at that particular monitoring point. The two reproduced signals may be visually compared and the level of one may be adapted to the level of the signal of known voltage, if desired.

The invention has been described with reference to a television plant for purposes of ease, but it will be appreciated that its use is not limited thereto.

My invention will best be understood with reference to the drawings in which:

Figure 1 schematically shows an arrangement for providing calibrated voltages of known value at various positions remote from a standard source of calibrated voltage;

Figure 2 shows one embodiment of my invention for providing continuous visual monitoring at a selected point in an electrical system by means of a visual indication of the proper signal level at that particular point in the system.

Figure 3 shows a typical reproduction on the face of the target of an oscilloscope tube of a marker signal and a video signal and;

Figure 4 shows one form of an electronic switch.

Referring to Figure 1 of the drawings there is shown a schematic block diagram arrangement of a circuit for distributing to various locations, a set of voltages having definite values and which are used for producing the mark on an oscilloscope tube as indicated hereinbefore in this specification. A source of calibrating voltage 10 is provided and a portion of this voltage is impressed onto a voltage indicating device 11 which may be in the form of a well calibrated meter. The calibrating voltage itself, may be of the normal sine wave form which is easily conducted to various points for test purposes. These points might be for instance, different studios or other points in a television plant.

The so calibrated voltage is then impressed onto a multiple output distribution unit 12. This distribution unit is well known per se and may take one of many forms. It is considered sufficient to say that it is a unit having a number of different output terminals each of which supplies a definite voltage. It could be for instance, in the form of a unit having a transformer arrangement with a single primary winding onto which the standard calibrating voltage is impressed and a number of secondary windings each deriving a definite voltage from the primary. On the other hand it could be an arrangement comprising an auto-transformer with the standard calibrating voltage impressed across the winding thereof and a number of different taps each supplying a definite portion of the calibrating voltage impressed onto the winding.

One such output is impressed onto a level control unit 13 which is pre-calibrated and the output of this unit may be conducted by well known conducting means to a position identified as remote point number 1 and at this point is impressed onto a cathode ray oscilloscope tube to create a calibrated mark on the face of the tube and which is indicative of the voltage value of the calibrating voltage. This will be done as set out hereinafter with respect to Figure 2. The calibrated level control may be in the form of a variable attenuating unit such as is well known in the art and which will allow the supplying of a definite portion of the output signal from the distribution unit to the cathode ray oscillograph tube at point 1.

Similarly, there is provided a second calibrated level control unit 14 the output of which may be sent by well known conducting means to an oscilloscope apparatus at a position identified as remote point number 2 and here a mark will be produced on the face of the cathode ray tube which is indicative of the peak amplitude voltage value supplied by the level control unit 14 to the tube at this point. The illustration has been made so as to indicate that the oscilloscope tubes are parts of a television plant and it will be appreciated that these may be located at widely divergent points with respect to each other and additionally that the levels sought to be indicated or set at these points may either be the same as each other or may vary considerably as it is well known that the desired level of various component signals, even within a single television studio, may vary widely. It will also be appreciated that the invention is not limited for use with television apparatus, but that the showing of such is made as one convenient example of the use of this invention.

Referring to Figure 2 there is shown a circuit arrangement for reproducing a signal whose level is to be set and for reproducing an indication on the face of a cathode ray tube of a definite calibrated voltage level. In this figure a cathode ray oscilloscope tube 20 has electrostatic deflection means 21 and 22 and it is on the screen or target of this tube that the reproduction of the calibrated signal voltage takes place.

A sawtooth wave generator 25 produces a sawtooth shaped voltage wave. Such generators are well known per se and will not be described in particularity at this point. An example of such generators for instance, is shown in U. S. Patents Nos. 2,185,363, granted January 2, 1940, to E. L. C. White and 2,207,529, granted July 9, 1940, R. Andrieu. In the normal television studio there is provided a source of synchronizing signals and these may be used to control the production of the sawtooth waves used with cathode ray deflection apparatus in a definite timed manner and the generator 25 may be controlled by such signals in order to provide well timed, accurate deflection and this has been indicated in the drawing as the "sync" input to the generator.

The output of the generator is impressed onto a so-called clipper circuit 26 which is a voltage limiter. Such clippers per se, are well known in the art and in general comprise voltage limiting devices which will not pass voltage waves outside of a selected range of values. An example of one such type of clipper is shown in U. S. Patent No. 2,132,655, granted October 11, 1938, to J. P. Smith. In these arrangements in general, an amplifying tube may be biased to operate in such a portion of its grid voltage-plate current characteristic such that voltages impressed on the grid thereof exceeding a pre-determined value, drive the plate current of the tube to its saturation point and hence limit the output thereof. The output of clipper 26 will have the general shape of the waveform indicated beside the conductor leading from the output circuit of the clipper to the horizontal deflection plates of the cathode ray oscilloscope tube 20.

Another portion of the output of the clipper may be passed to a pulse amplifier and shaping apparatus 27. A signal which is developed in the clipper may be amplified to a desired degree and shaped so that the output of the pulse waveform is rectangular and occurs during the time that the distorted sawtooth waveform has a flattened portion. Pulse shapers per se are well known and different forms thereof may be used. One such form which could be used here might be in the form of a clipper which is set to pass signals beginning at a voltage value very nearly that attained by the flattened portion of the sawtooth wave and in this manner substantially all of the sawtooth component would be cut-off and only the flattened portion of the wave would be passed through the pulse shaper. This not only would provide a substantially rectangular waveform to the pulses but would also cause the waveform to be developed at the time when the deflecting waveform was passing through the flattened portion of its cycle. The rectangular waveform so developed and occurring during the time that the deflecting waveform is passing through the flattened portion of its cycle, is impressed onto one of the input circuits of an electronic switch 28.

The electronic switch has two input circuits. Onto one of the input circuits there is impressed the signal whose level is to be indicated, and which is to be set, and the output of the switch is impressed onto an amplifier 29, which in this case is illustrated as a video amplifier since the invention is being described with respect to its use in a television plant. The output of the video amplifier is impressed onto the vertical deflecting plants of the cathode ray oscilloscope tube 20.

The second signal impressed onto the electronic switch is the calibrated voltage signal which has been conducted to the cathode ray oscilloscope in the manner illustrated hereinbefore with respect to Figure 1.

Referring to Figure 4 there is shown one form of an electronic switch which may be used in conjunction with the presently described apparatus. In general the switch comprises two tubes having a common output circuit and having individual input circuits. One of the tubes is biased so that it is normally maintained below cut-off and this is the tube onto whose input the rectangular wave is impressed in a positive polarity to drive the tube to a conducting state. The calibrated voltage signal also is impressed onto the input of this tube and accordingly will pass through to the video amplifier during the time when the rectangular waveform drives the tube to a conducting state.

The other tube has impressed onto the input circuit thereof the video signals whose level is to be set and this tube normally is conducting so that there will appear in the common output circuit of the two tubes a representation of the video signal. During the time that the rectangular pulse is developed, however, the pulse may be impressed onto the input circuit of the second tube in a negative sense in order to drive the tube below cut-off. During this interval then, and this is the time during which the horizontal deflecting wave is passing through its flattened portion and the horizontal deflection is stopped, the passage of the video signals to the video amplifier will be cut-off and only the marker signal will be reproduced by the cathode ray tube target.

In this figure the tube 30 is the tube which is normally maintained in a conducting state and onto the input circuit of which is impressed the normal video signal and also the substantially rectangular pulse which has been developed during the time the horizontal deflecting wave is at the flattened portion thereof. The pulse is impressed onto this tube in a negative direction so that during the pulsing time the tube is driven to cut-off.

The tube 30 has the plate thereof tied together with the plate of tube 31 and both have a common load resistor 32 and a source of direct current biasing potential 33. The tube 31 is normally maintained in a blocked or non-conducting state by the negative biasing source 34 which biases the control grid negatively with respect to the cathode thereof. The control pulse which is developed during the time that the horizontal deflecting wave is flattened in shape, is impressed onto the grid in a positive polarity and drives the tube from its cut-off state to a conducting state during the pulse interval. There is also impressed onto the tube the calibrated voltage which produces the marker signal on the face of the cathode ray oscilloscope tube 20. Accordingly, there will appear in the output circuit of the electronic switch during the time that the horizontal deflecting wave is traversing its linear portion, the signal whose level is to be indicated and, there will appear in the output circuit of the electronic switch during the time that the horizontal deflecting wave is traversing the flat portion thereof, the sine wave of calibrated value and which is indicative of the proper level of the signals which should appear at a particular point in the electrical system. Since the sine wave will be fed to the vertical deflecting plates of the oscilloscope tube during the time when the horizontal wave is flat, that is to say remains at an even value, the wave will be reproduced as a straight line mark on the target of the oscilloscope tube and the length of the mark will be indicative of the peak amplitude value of the sine wave. Since the beam in the tube will be deflected linearly during the interval that the sawtooth wave portion of the deflecting wave is being created, the video signals, or other signals, which pass through the amplifier during this particular interval will be reproduced normally. The amplitudes of the marker signal and the other signal may be visually compared and the level of the video signal could be adjusted to be the same as that of the marker system by adjusting the value of the signal prior to its impression onto the electronic switch.

Figure 3 shows a typical reproduction of a marker signal and a video signal produced in accordance with this invention on the target of the oscilloscope tube 20.

Having now described the invention what is claimed is:

What is claimed is:

1. In a signal level indicating apparatus, a source of signals of known voltage, a cathode ray tube having means for generating and directing a cathode ray toward a reproducing target, means for sweep deflecting said cathode ray beam in a first coordinate of movement at a predetermined rate, means to interrupt the sweep deflection of said beam for a predetermined time, means for deflecting said cathode ray beam in a second coordinate of movement and means for impressing the signals of known voltage onto the second coordinate deflecting means of the cathode ray tube during the predetermined timed interruption of the beam sweep deflection.

2. Apparatus in accordance with claim 1 wherein there is provided in addition, a source of signals whose signal level is unknown and is to be indicated and wherein both the signal of known voltage and the latter unknown signals are alternately impressed onto the second coordinate deflecting means of the cathode ray tube, said known voltage signals being impressed thereon only during the interruption of the beam sweep in its first coordinate of movement while said unknown voltage signals are applied only during the actual sweep of the beam in its first coordinate of movement.

3. Apparatus in accordance with claim 2 wherein the signals of known voltage are periodically recurrent and of a frequency substantially higher than the predetermined sweep deflection rate.

4. A signal level indicating apparatus comprising a cathode ray tube having means for generating and directing a cathode ray beam toward a reproducing target, means for deflecting the beam in two coordinates of motion, signal generating means, means for coupling the output of said signal generating means to said deflecting means to cause sweep deflection of the cathode ray beam in one coordinate of movement, a source of signals of known voltage value, a source of signals whose level is to be indicated, means for impressing the signal of known voltage onto the deflecting means of the cathode ray tube at a first part of the deflection cycle, means for impressing the signal whose level is to be indicated onto the deflecting means of the tube at a second part of the deflection cycle, and means for altering the rate of beam deflection during the second part of the deflection cycle.

5. A signal level indicating apparatus comprising a cathode ray tube having means for generating and directing a cathode ray beam to a reproducing target, a source of signals of known voltage value, a source of signals whose level is to be indicated, means for deflecting the cathode ray beam in at least one coordinate of movement, deflection generator means, means to form the output waves from the deflection generator into waves having a flattened portion, means for impressing the waves having the flattened portion onto the deflecting means for deflecting the cathode ray beam in one coordinate of movement whereby the beam is deflected at a plurality of sweeping speeds, cathode ray beam influencing means, means for impressing the signal of known voltage onto said cathode ray beam influencing means during the interval when the beam is being deflected in said one coordinate of movement and at said one sweeping speed and means for impressing the signal whose level is to be indicated onto the beam influencing means during the interval when the beam is being deflected at another sweeping speed.

6. Apparatus in accordance with claim 5 wherein the deflection generator produces a sawtooth shaped wave and wherein the sawtooth wave is impressed onto an amplitude limiting circuit to form a waveform having a sawtooth component and a flattened portion.

7. Apparatus in accordance with claim 5 wherein said signal whose level is to be indicated includes a timing component and wherein the means for impressing the signal of known voltage onto the electron beam influencing means when the deflection sweeping speed is of one value and for impressing the signal whose level is to be indicated onto the beam influencing means when the deflection sweeping speed is of another value comprises an intermittently operated switch held in synchronous operation with said timing component of the signal whose level is to be indicated.

8. Apparatus in accordance with claim 7 wherein there is provided in addition, means producing a substantially rectangular wave and energized by at least a portion of the sawtooth shaped wave having a flattened component, and wherein said switch is operated by said rectangular wave so that the signal of known value is impressed on to the beam influencing apparatus when the beam is deflected at one speed and the signal whose level is to be indicated is impressed onto the beam influencing apparatus when the beam deflection speed is of another value.

9. A signal level indicating apparatus comprising a cathode ray tube having means for generating and directing a cathode ray beam to a reproducing target, a source of signal voltage of known value, means for deflecting the cathode ray beam in a first coordinate of movement, means for deflecting the cathode ray beam in a second coordinate of movement, sawtooth wave generating means, amplitude limiting means, means for impressing the output of said sawtooth wave generating means onto the amplitude limiting means to produce a waveform in the output circuit thereof which comprises a waveform having sawtooth component and a flattened component, means for impressing the so distorted waveform onto the means for deflecting the cathode ray beam in one coordinate of movement, a pulse shaping circuit, means for impressing a portion of the output of the amplitude limiting means into said pulse shaping circuit and producing in the output thereof a substantially rectangular pulse occurring during the interval that the flattened portion of the distorted sawtooth deflecting wave is impressed onto the cathode ray beam deflecting means, switch means, means for impressing both the voltage of known value and the signal whose level is to be indicated onto the input of said switch means, means for impressing the rectangularly shaped occurring pulses onto the switch means to selectively allow the passage therethrough of the signal of known value and the signal whose level is to be indicated, and means for impressing the signal passing through said switch means onto the mean for deflecting the cathode ray beam in the other coordinate of movement.

DONALD H. CASTLE.

REFERENCES CITED

The following references are of record in the file of this patent:

UNITED STATES PATENTS

| Number | Name | Date |
|---|---|---|
| 2,059,004 | Leeds | Oct. 27, 1936 |
| 2,122,499 | Stocker | July 5, 1936 |
| 2,143,397 | White | Jan. 10, 1939 |
| 2,146,862 | Shumard | Feb. 14, 1939 |
| 2,221,115 | Shepard | Nov. 12, 1940 |
| 2,293,135 | Hallmark | Aug. 18, 1942 |
| 2,444,338 | Dimond | June 29, 1948 |
| 2,463,969 | Hulst | Mar. 8, 1949 |

OTHER REFERENCES

The Oscillographer, vol. 9, No. 2, published by Allen B. Dumont Lab., Inc., Passaic, N. J., A New Oscillograph Accessory for Direct Measurement of Signal Amplitude by G. Rob't Mezger, March-April, 1947. (Copy in Division 69.)